(No Model.)

F. H. RICHARDS.
WEIGHING MACHINE.

No. 579,447.　　　　　　　　Patented Mar. 23, 1897.

Witnesses:
Chas. D. King.
Fred. J. Dole.

Inventor:
F. H. Richards (No Model.)

F. H. RICHARDS.
WEIGHING MACHINE.

No. 579,447.

7 Sheets—Sheet 2.

Patented Mar. 23, 1897.

Witnesses:
Chas. D. King.
Fred. J. Dole.

Inventor:
F. H. Richards, (No Model.)

F. H. RICHARDS.
WEIGHING MACHINE.

No. 579,447.

7 Sheets—Sheet 5.

Patented Mar. 23, 1897.

Witnesses:
Chas. D. King.
Fred. J. Dole.

Inventor:
F. H. Richards.

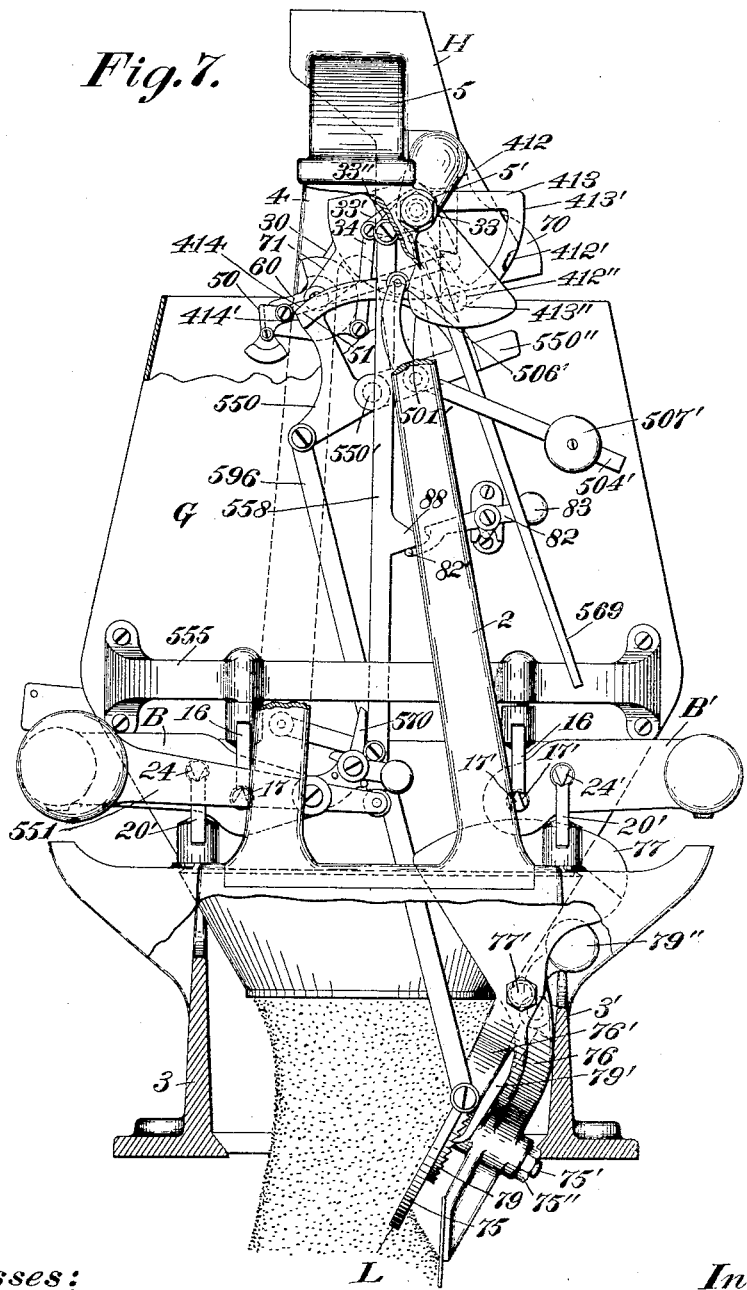

(No Model.)  7 Sheets—Sheet 7.

F. H. RICHARDS.
WEIGHING MACHINE.

No. 579,447.  Patented Mar. 23, 1897.

Witnesses:
Chas. D. King.
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,447, dated March 23, 1897.

Application filed April 27, 1896. Serial No. 589,219. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, one of the objects of the invention being to provide improved closer mechanism embodying a closer supported for a step-by-step movement, so that on such movement the mass sustained by the closer will be positively dislodged or shaken therefrom and its free discharge thereby insured.

Another object of the invention is the provision of improved valve mechanism comprising a valve having oppositely-directive stream-outlets, whereby said valve is operable for directing the stream-supply toward opposite points in the bucket, and an even loading of the latter may be obtained.

Figure 1:
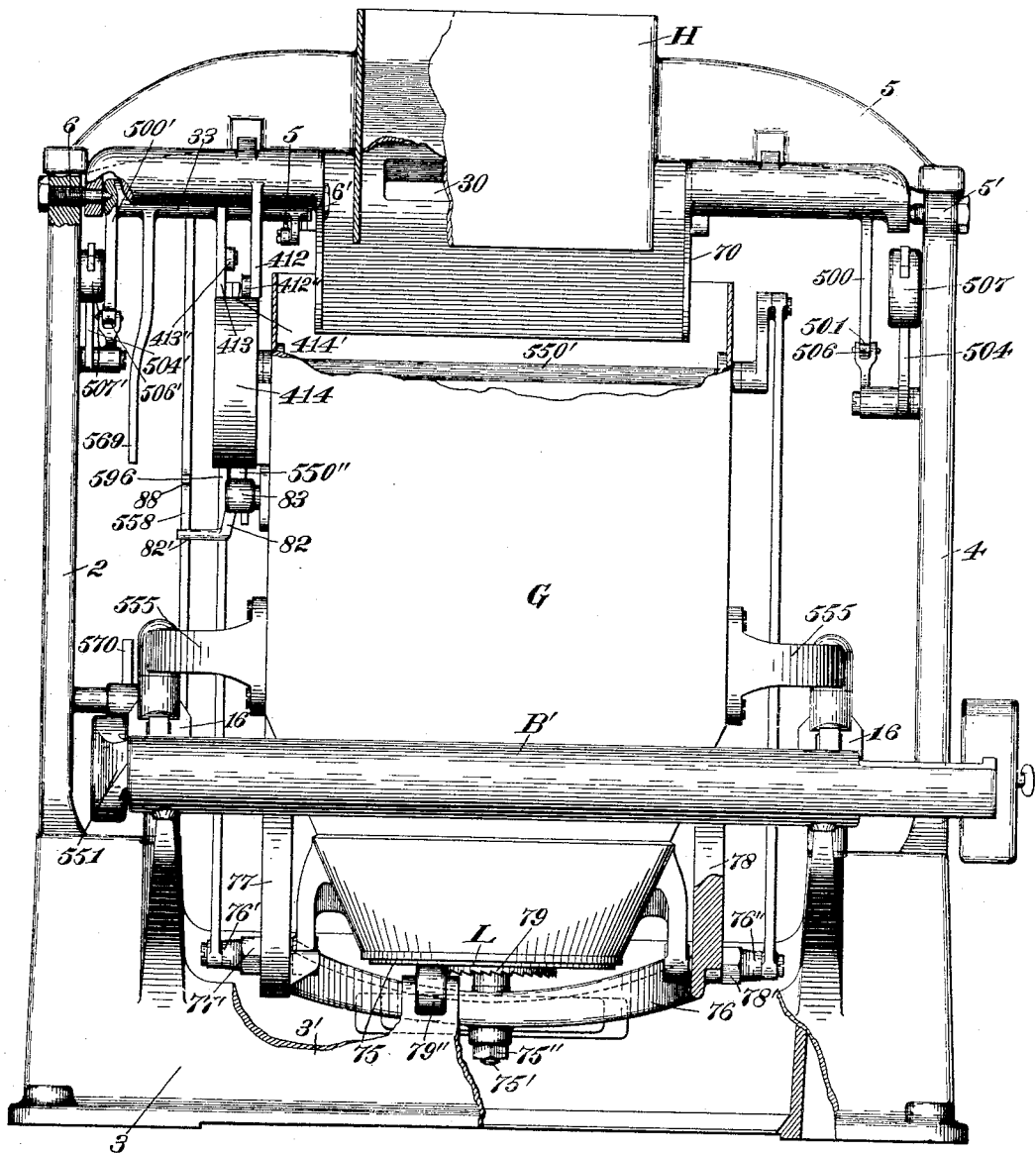
Figure 2:
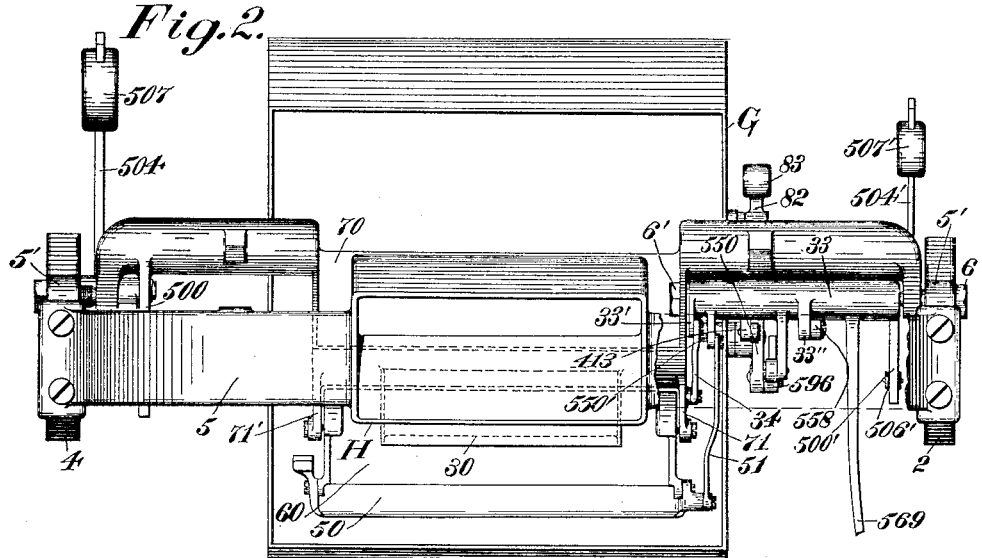
Figure 3:
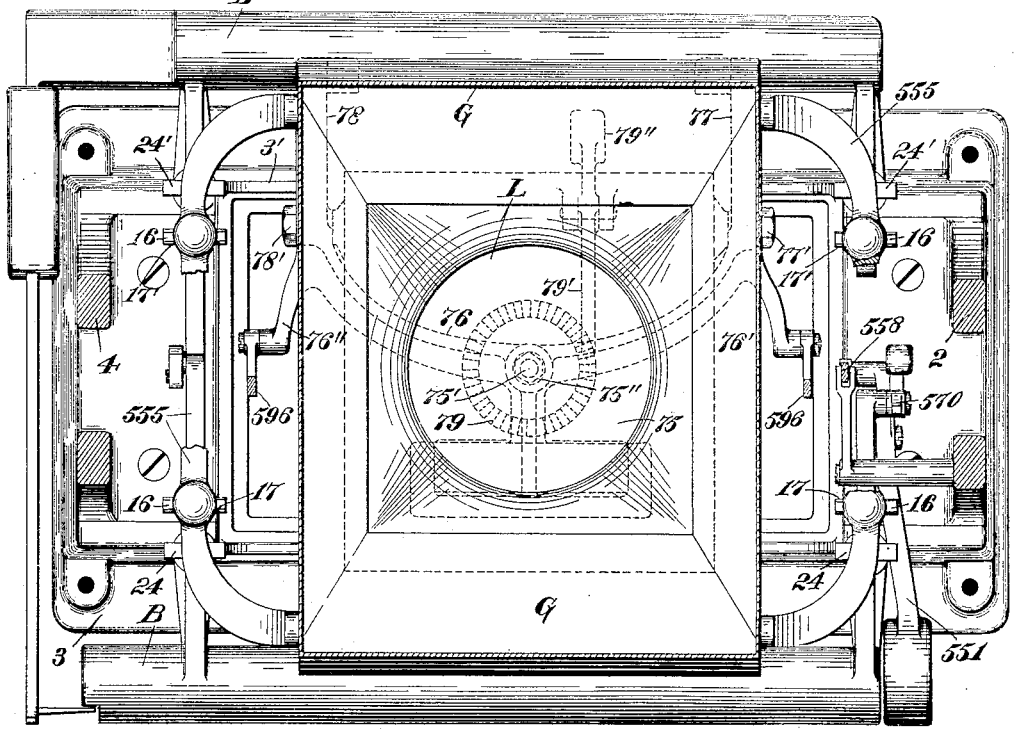
Figure 4:
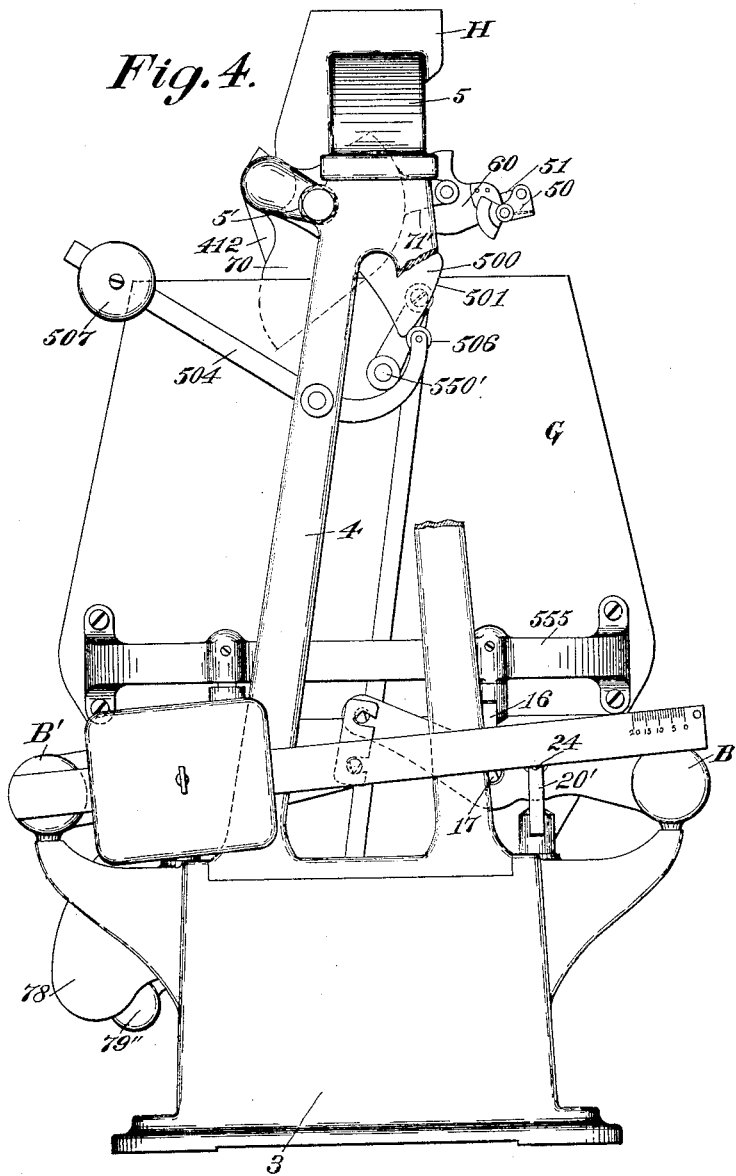
Figure 5:
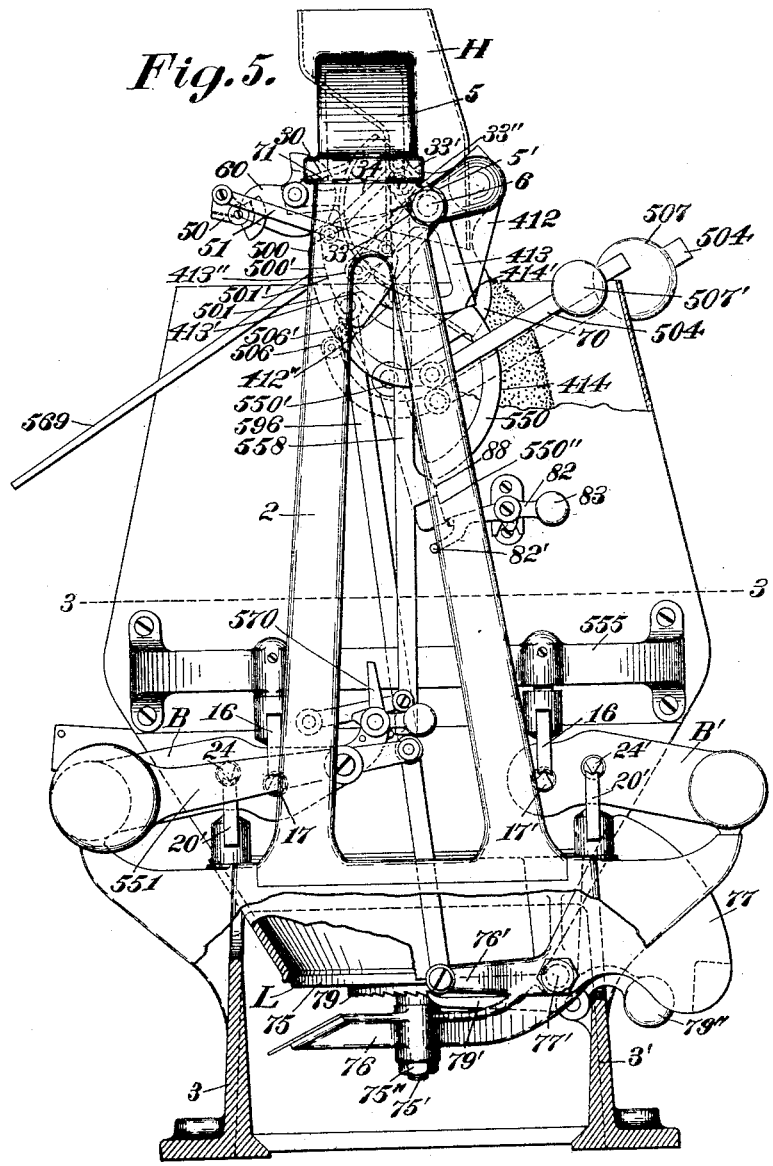
Figure 6:
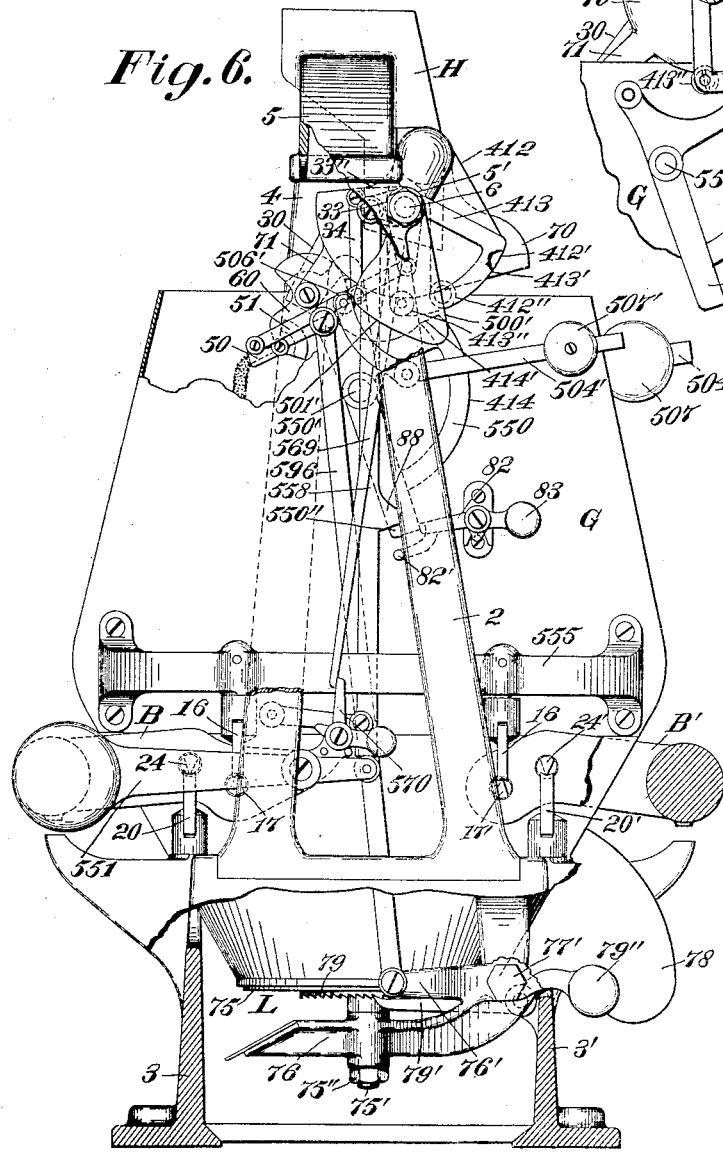
Figure 9:
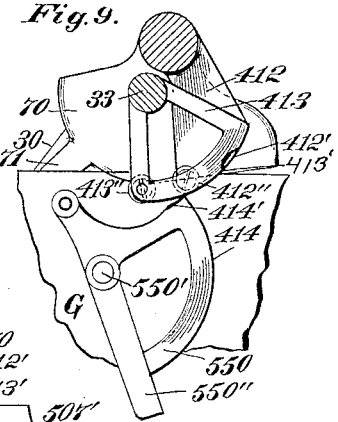
Figure 8:
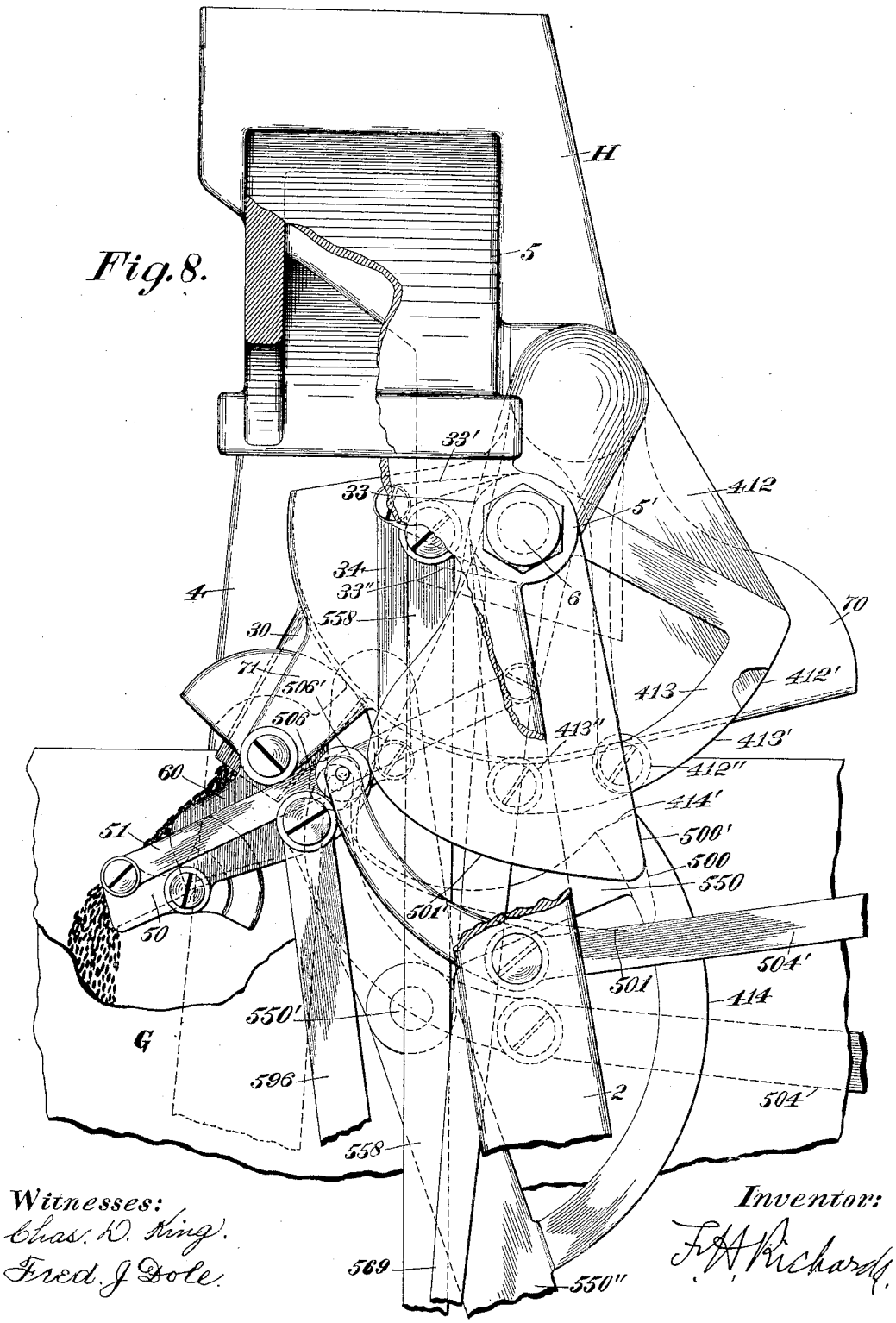

In the drawings accompanying and forming part of this specification, Figure 1 is a front elevation of a weighing-machine embodying my improvements in the preferred form thereof and illustrating the positions assumed by the respective operative mechanisms at the commencement of operation. Fig. 2 is a plan view of the upper part of the machine. Fig. 3 is a central horizontal section of the machine on the line 3 3, Fig. 5, illustrating more particularly the peculiar construction of the bucket-closer. Fig. 4 is an end elevation of the machine as seen from the right in Fig. 1 and illustrates a part of the valve and valve-actuating mechanisms. Figs. 5, 6, and 7 are end elevations as seen from the left in Fig. 1 and illustrate the positions occupied by the valve and closer mechanisms at the commencement of operation and during the poising and bucket-discharge periods, respectively. Fig. 8 is a detail view, in end elevation, as seen from the left in Fig. 1, and on an enlarged scale, of the valve mechanism; and Fig. 9 is a detail view of the stop devices.

Similar characters designate like parts in all the figures of the drawings.

For convenience in illustrating the nature and purpose of my present invention this is shown in connection with a weighing-machine of the improved kind disclosed in Letters Patent No. 548,840, granted to me October 29, 1895, to which reference may be had; but it is distinctly to be understood that the invention is not limited to such an application, as it is capable of efficient use in connection with other types of weighing-machines.

The framework for supporting the operative mechanism and parts of the machine may be of any suitable construction, and it is herein shown comprising the side frames or members 2 and 4, mounted upon the chambered supporting-base 3 and connected at the top by the plate or beam 5, on which the chute or hopper H may be mounted. The base 3 is illustrated carrying beam-supports, herein illustrated as V-shaped bearings 20'.

The beam mechanism for the bucket is shown comprising the oppositely-disposed counterweighted scale-beams B and B', respectively, the arms of which are shown carrying pivots or knife-edges 24 and 24', resting on the beam-supports.

As a means for supporting the bucket, which is designated in a general way by G, the beam-arms are shown carrying a second series of pivots or knife-edges 17 and 17' for supporting the V-shaped or other bearings 16, suitably connected to the bucket-hangers 555, carried on the opposite ends of the bucket.

The closer for the bucket G will preferably be supported for rotative movement, so that by such action any of the mass which tends to stick or cling thereto will be positively dislodged and its free discharge insured. For effecting this peculiar movement of the bucket-closer suitable means may be employed, one form of which is herein illustrated, and will be hereinafter specifically described, although other means for either continuously or intermittingly moving said closer I consider within the purview of my invention.

The closer mechanism is designated, in a general way, by L, and is shown comprising the closer proper, 75, which, in the present instance, consists of the circular plate fitting tightly within the correspondingly-shaped lower end of the bucket G, as indicated in Fig. 5, so that when in its said shut or normal position no space or opening is left for the accidental escape of the material, which frequently occurs at the commencement of flow of the supply-stream.

As a means for rotatively supporting the closer 75 the yoke 76 is shown, which has preferably formed integral therewith the counterweighted arms or blades 77 and 78, pivoted, respectively, at 77' and 78' to the bucket G and adjacent to the discharge-opening thereof, the office of said counterweighted plates being to return the closer 75 to its normal or shut position, said plates practically forming a continuation of the closer-supporting yoke 76.

The closer-plate 75 is shown provided approximately centrally thereof with a downwardly-extending spindle or pivot 75', which is journaled in a suitable bearing formed in the yoke 76, and which is also provided with a suitable device for preventing its displacement—such as the nut 75'', which is threaded on the lower end of said spindle.

As a suitable means for rotating the closer or closer-plate 75, which action preferably occurs on the opening movement thereof, a pawl and ratchet are herein illustrated. Said ratchet is designated by 79, and is herein shown circular, it being suitably secured to the under side of said closer-plate 75. The pawl for operating said ratchet is designated by 79', and will preferably be supported independently of the closer mechanism, it being herein shown pivoted to the front wall 3' of the base 3, and having also a counterweight 79'' or equivalent means for maintaining the pawl in operative engagement with the teeth of the ratchet.

The rotation of the closer will, as hereinbefore stated, preferably take place on its opening movement, and the operation of this peculiar feature of my present invention will be clearly understood from an inspection of the drawings.

Suitable means are employed for normally maintaining the bucket-closer 75 against opening movement, and at the proper point in the operation of the machine said closer is released, and the weight of the bucket contents pressing thereagainst will force the same open, so that said contents may be discharged into the chamber of the supporting-base 3, and during the rotative movement of the closer the mass thereon will be positively dislodged or loosened sufficiently to insure its free flow.

The point of the pawl 79' will be held in engagement with the teeth of the ratchet 79 throughout the movement of the closer 75 by the counterweight 79'', and as said closer commences to open, the pawl will be effective, by engaging one of the series of ratchet-teeth, partially to rotate said closer, and when the pawl has passed out of contact with such tooth it will engage a succeeding tooth of the series, further rotating said closer until the latter has reached the limit of its opening movement. As the closer resumes its normal or shut position the pawl 79' will run idly or ineffectively over the teeth of the ratchet, as is usual with such devices.

As a means for sustaining the closer 75, and for also holding the same against opening or load-discharging movement, the means herein illustrated may be employed, and will now be described.

The yoke 76 is shown having suitably formed thereon the arm 76', the purpose of which will now be described. The bucket G is illustrated carrying the rocker 550, constituting one member of a toggle, which is pivotally supported thereon at a point preferably midway and near the upper edge thereof. This rocker, as stated, constitutes one member of a toggle, the other member being shown as the connecting-rod 596, which is pivotally connected with said rocker 550 and with the closer mechanism, the lower end of said rod being attached to the arm 76' in such a manner that when the closer is shut the two pivots of said connecting-rod 596 will be approximately in line with, and the upper of said pivots will be disposed above, the rocker-pivot, so that when said rocker is engaged by a latch or analogous device the rocker, and hence the connected closer L, may be held against opening movement, as, practically, the entire weight of the bucket contents will be supported from the pivot of the rocker. The pivot for the rocker is shown as a transverse shaft 550', extending through the opposite bucket-walls, said rocker being connected with one of said shaft ends, the other end thereof being preferably operatively connected by suitable means with the arm 76'' of the closer-supporting yoke 76.

The latch for the closer is designated by 82, and is herein shown pivotally supported on the bucket and also preferably provided with a detent for engaging a coöperating detent on one end of the rocker-arm 550'' when the closer is shut, a counterweight 83 being shown for swinging said latch upward to engage said rocker-arm.

As a means for controlling the supply-stream which issues from the chute or hopper H, the valve mechanism herein illustrated will preferably be employed, which comprehends a valve having opposite outlets, so that the stream of material may be caused to flow first in one and then in the other direction by said valve, and an even loading of the bucket will thus be assured.

The valve mechanism herein illustrated comprises three valves, which, for convenience, may be termed the "main," the "supplemental," and the "drip" valves, the first-mentioned of which is operable for oppositely directing the supply-stream, as hereinbefore specified. The main valve is designated by 70, and is of the "pan-valve" type, it being shown pivotally supported for oscillation beneath the mouth or discharge-outlet of the hopper or chute H, its axis extending through the descending column or stream of material, so that when said valve is in its closed position it may support the said descending mass of material, as indicated in Figs. 6 and 7. The rear wall of the valve 70 is shown intersected by a tubular conduit projecting therefrom, which may be of suitable shape and size, and through which a stream of material may flow from the valve 70 when the latter has reached a predetermined point in its closing movement, or has cut off the main stream or supply.

The tubular stream-conduit just alluded to is designated by 30, and it will be evident that when the valve 70 has reached a predetermined point in its closing movement, as indicated in Figs. 6 and 8, a stream of material may flow from the chute H through said conduit, being directed into the bucket by the valve 60.

As a means for actuating the valve 70 to close the same, the means shown may be employed, which are similar to the valve-actuating mechanism disclosed in Letters Patent No. 548,843, granted to me October 29, 1895, to which reference may be had.

It will be remembered that the valve 70 has been described as oscillatory, and for supporting the valve the arms or lugs 5', formed on the framing of the machine, will be preferably employed, said valve being pivoted between said arms or lugs.

A valve-closing cam is shown at 500, depending from and oscillatory with the valve 70, the cam-surface of which is in position to be engaged by a suitable device for effecting the closure of said valve.

The side frame 4 is illustrated pivotally supporting the lever 504, which constitutes a valve-closing device, the forward arm of said lever being preferably counterweighted, as at 507, and the rear or short arm of said lever being shown equipped with an antifriction-roll 506, positioned for engaging the cam-surface 501 of the cam 500, so that as said roll rides along said face the valve 70 may be closed through the power of the descending counterweight 507.

For actuating the valve 70 to open the same the means hereinafter described may be employed.

That part of the supply-stream which flows from the hopper or chute H, and which is cut off by the main valve 70, it will be apparent, constitutes the main stream. The drip tubular stream will flow from the valve 70, being received thereby from said chute or hopper, through the rear discharge-outlet or conduit 30 and into the bucket G. For controlling this drip-stream the valve 60, constituting a supplemental valve, is illustrated. Said valve 60 is shown supported by the main valve 70 for shifting movement thereon and adjacent to the discharge-conduit 30. For supporting the supplemental valve 60 the back wall of the valve 70 is shown having the rearward-extending arms 71 and 71', between and to which the supplemental valve is pivoted.

When the valve 70 is in its open position, as indicated in Fig. 5, it will be obvious that the full volume of the supply-stream may flow into the bucket G, and as the stream flows into said bucket the latter will descend, the valve 70 being simultaneously closed by the counterweighted lever 504 in the manner hereinbefore described, and to the position indicated in Fig. 6, and at such a disposition that a stream of material may flow through the conduit 30 toward the supplemental valve 60, to be directed by the latter into the nearly-loaded bucket, it being understood that at this point the main valve 70 has cut off the main stream and has reached the end of its stroke or main-stream cut-off movement. As will be obvious, the walls of the projecting conduit 30 positively guide and direct the drip-stream to the supplemental valve 60 and prevent scattering of the particles composing said stream.

The supplemental valve 60 will have a drip-stream cut-off movement independently of the main valve, this movement being an upward oscillation for intercepting the flowing drip-stream and arresting said flow, whereby it is prevented from entering the loaded bucket.

The means herein illustrated for causing the upward oscillation or closing movement of the supplemental valve 60 will now be described.

A relatively short rock-shaft is illustrated at 33, pivotally supported between the valve 70 and the side frame 2, the supports for said shaft being shown as the pivot 6 for the main valve 70, and a pivot-pin 6', suitably carried by one of the end walls of the valve 70. The shaft 33, it will be evident, has a rocking movement independent of the valve 70, so that its action cannot affect said valve. The rock-shaft 33 is shown having formed thereon a lug or ear 33', to which is pivotally connected the link 34, the opposite end of the latter being similarly connected with the supplemental valve 60 at one side of its axis of movement, herein shown as below. It will be evident that when the shaft 33 rocks, the connected valve 60 will be shifted simultaneously in an opposite direction to either open or close. The shaft 33 is shown having a cam 500' oscillatory therewith, the cam-surface of which is positioned for engagement by a suitable lever or equivalent valve-actuating device. The lever for this purpose is designated by 504', which is shown pivotally supported by the side frame 2, the forward arm of said lever having the adjustable counterweight 507', and the rear or short arm the antifriction-roll 506', so that when these parts are in the positions indicated in Fig. 6 the antifriction-roll 506' may ride along the cam-surface 501' of the cam 500', oscillating said cam and its supporting-shaft to what is herein illustrated as the "right," and oppositely shifting the supplemental valve 60 through the described connections, whereby the latter is operable for cutting off the drip-stream which flows from the conduit 30 of the valve 70.

As a means for opening the valve 60 and subsequently opening the main valve 70, the means shown will be preferably employed. The rock-shaft 33 is shown having a lug or ear 33″, to which is pivotally connected a relatively long thrust or connecting rod 558, the lower or free end of which is in position to be engaged by a suitable valve-opening actuator, which is herein shown as the shiftable two-stroke lever 551, pivotally supported by the scale-beam B at a point adjacent to the inner end thereof. This counterweighted lever 551 normally adds its force to the counterweighted side of the beam B, a suitable stop or stops being employed to maintain the same in such position, but is shiftable at a predetermined point in the operation of the machine about its pivot, so that its effective force is subtracted from said counterweighted side of the scale-beam B. On the return movement of said lever an upward thrust will be imparted to the rod 558 sufficient for opening the supplemental valve 60 to permit the escape of the accumulated material at the rear of the valve 70, and subsequently opening the main valve 70 to cause the flow of the full supply-stream. The operation of these valve-opening parts will be readily understood. The rock-shaft 33 is oscillated by the said lever 551 through the intervening rod 558, a short movement being sufficient to open or reversely shift the supplemental valve 60. As soon as the supplemental valve 60 is fully opened it is intercepted by a suitable stop, so that the thrust of the lever 551 as it returns to its normal position is directed against the rear of the valve 70 for opening the same to cause the flow of the supply-stream.

The normal tendency of the supplemental-valve-closing lever 504′ is to close the supplemental valve 60 by the riding of the antifriction-roll 506′ along the cam-face 501′; but this action will be prevented by the shiftable lever 551, which engages the thrust-rod 558, the latter being operatively connected with the supplemental valve 60, said lever serving as a valve-stop for this purpose.

At a predetermined point in the operation of the machine, or when the main valve 70 has cut off the main stream, a drip-stream will flow from the conduit 30 in the rear thereof, the mechanism then being in the position illustrated in Fig. 6.

For preventing the shifting or closing movement of the supplemental valve 60 by its actuator 504′ the following means are shown: The supplemental-valve shaft 33 is shown having the depending stop-rod 569, which is oscillatory therewith, the path of movement of which is intersected by a suitable stop, the stop for this purpose being illustrated as the by-pass 570, pivotally supported by the scale-beam B. When the main valve 70 has reached its stream-cut-off position, the by-pass 570 will engage the stop-rod 569 of the supplemental-valve shaft 33, and will thereby hold the valve 60 against closing movement. While the supplemental valve 60 is thus held, the drip-stream will flow into the bucket, the beam mechanism will have a further descending movement, and the counterweighted lever 551, moving therewith, will fall from under the connecting-rod 558, which is also held against descending movement. When the load is completed, the stop 570 will release the stop-rod 569—such action being due to the descent of the beam B—and also the connected supplemental valve 60, so that it may be instantly shifted or closed by its lever 504′.

It will be remembered that a latch 82 has been described as normally operative for preventing the opening movement of the closer 75 by engaging an arm or stop 550″ of the rocker 550. Said latch is depressible, so that its detent may be disengaged from the cooperating detent of the rocker 550. For effecting this releasing movement of the latch 82 a projection 88 is shown formed on the thrust-rod 558, so that during the last-mentioned movement of the supplemental valve 60 said projection may be forced into contact with a pin, as 82′, on the latch 82 for tripping said latch and hence releasing the bucket-closer 75.

A drip-valve is also illustrated herein, the peculiar function thereof being to catch the drizzle or spray which is projected from the valve 60 by the force of its cut-off movement. The drip-valve is designated by 50, and is shown pivotally supported adjacent to the discharge edge of the supplemental valve 60, and as having an upward shifting movement for catching said spray. The drip-valve is shown as being a blade and as operatively connected by the link 51 with the supplemental-valve rock-shaft 33, so that when the supplemental valve 60 is closed for cutting off its drip-stream the drip-valve 50, through said connection, may be shifted simultaneously therewith, or to the position indicated in Fig. 7, said drip-valve 50 being shown substantially vertically disposed and acting as an effective bar to the flow of the spray or drizzle into the then-loaded bucket.

My present invention also comprehends the provision of reciprocally effective stops operative, respectively, with the valve and closer mechanisms, whereby the premature operation of either will be positively prevented.

The rocker 550 is illustrated as constituting a closer-operative stop; and its stop face or tread is shown as being relatively wide, so that the coacting stops of the two valves 60 and 70 may run along said stop-face. The stop for the main valve is designated by 412, and the supplemental-valve stop is designated by 413, both preferably being, like the rocker-stop 550, of segmental form. The supplemental-valve stop 413 is shown carried by the rock-shaft 33 for rotation therewith, and it will be apparent that as said stop is intercepted in its movements the limitation in movement of the connected valve 60 will necessarily follow. Each of the stops is shown provided with a pair of supplemental stops or stop-faces.

The rocker-stop 550 is illustrated having the relatively wide stop-face 414 and the approximately straight stop-face 414', which departs therefrom.

The valve-stop 412 has the curved stop-face 412', and the stop 412" is herein illustrated as an antifriction-roll, the stop 413 being shown similarly equipped, its two similar stop-faces being designated, respectively, by 413' and 413".

The operation of the hereinbefore-described stop system is as follows: It will be understood that by virtue of the stop system the closer cannot be opened while either of the valves is open and the supply-stream or any part thereof is flowing into the bucket, nor can either of the valves be opened while the closer is open. At the commencement of flow of the supply-stream the various operative mechanisms will be in the position illustrated in Fig. 5, with the stop-face 414' in contact with the stop-faces 412' and 413', so that should the latch 82 be accidentally or maliciously depressed the closer 75 cannot be opened, this action being prevented by the two stops 412 and 413, which, during this peculiar action, are in the nature of fixed abutments and prevent or check the oscillation of the closer-connected stop 550. When the stop 412' has passed out of contact with the stop 414', it will be evident that the rocker-stop 550 may oscillate, so far as the stop 412 is concerned. Succeeding this, however, the stop 413 continues its effective action, its stop-face 413 continuing in contact with the stop-face 414'. When, however, these stops have passed out of contact—due to the closing of the valve 60—and the two rolls 412" and 413" have intersected the plane of curvature of the stop-face 414, the stop 550 is free to oscillate about its pivot, and the closer 75 may be forced open by the weight of the bucket contents, provided the latch 82 has been depressed. On the oscillation of the rocker 550 its stop-face 414 will engage the two rolls 412" and 413", so that any tendency of either of the valves to open will be positively prevented by said stop 550.

The operation of the hereinbefore-described apparatus is as follows: The bucket-closer 75 being closed and maintained in such position by the latch 82, which engages the closer-connected rocker 550, and the valve 70 being open, the full volume of the supply-stream will flow from the chute over the valve 70, being directed into the empty bucket by said valve. When a certain portion of the mass has been received by the bucket, it will descend, the beam mechanism descending in unison therewith, and the counterweighted lever 551 moving with the scale-beam B. As the counterweighted lever 551 falls from under the thrust-rod 558 the valve 70 is free to be closed by the lever 504, the antifriction-roll 506 of which rides along the cam-face 501 of the valve-closing cam 500. At the commencement of the poising period the valve 70 will have cut off the main stream, the drip-stream flowing rearward therefrom and through the conduit 30, whence it descends into the bucket G over the supplemental valve 60. At this point in the operation of the machine the supplemental valve 60 will be held against closing movement to permit the flow of the drip-stream into the bucket by the by-pass stop 570, which engages the stop-rod 569 of the supplemental valve. When the valve 60 is thus held, the drip-stream will flow into the bucket, this and the beam mechanism gradually descending and the counterweighted lever 551 moving with the scale-beam B and falling from under and away from the rod 558. When the supplemental valve 60 is released—due to the descent of the scale-beam B, which is provided with the stop 570 and which releases the valve-stop rod 569—the supplemental valve 60 will be instantly closed, and the drip-valve 50 simultaneously shifted upward, by the supplemental-valve-closing lever 504', the roll 506' of which rides along the cam-surface 501' of the cam 500'; and during this action the thrust-rod will be forced downward, with its projection 88, into contact with the latch-pin 82', tripping the latch 82 and freeing the bucket-closer 75, so that the weight of the bucket-load may force said closer open to discharge said load.

Having described my invention, I claim—

1. In a weighing-machine, the combination with beam mechanism, and with a bucket supported thereby; of a rotatable closer for said bucket.

2. In a weighing-machine, the combination with beam mechanism, and with a bucket supported thereby; of a rotatable closer for said bucket; and means for rotating said closer.

3. In a weighing-machine, the combination with beam mechanism, and with a bucket supported thereby; of a closer for the bucket supported for opening and closing movements; and means for rotating said closer.

4. In a weighing-machine, the combination with beam mechanism, and with a bucket supported thereby; of a closer for the bucket supported for opening and closing movements; and means for rotating said closer on its opening movement.

5. In a weighing-machine, the combination with beam mechanism, and with a bucket supported thereby; of a closer for the bucket; a ratchet carried by said closer; and a pawl for said ratchet.

6. In a weighing-machine, the combination with beam mechanism, and with a bucket supported thereby; of a closer for the bucket; a ratchet carried by said closer; and a counterweighted pawl supported by a relatively-fixed part of the machine for engaging said ratchet.

7. In a weighing-machine, the combination with beam mechanism, and with a bucket supported thereby; of a closer for the bucket; a toggle connected with the closer; means for engaging one of the toggle members; and means for rotating said closer.

8. In a weighing-machine, the combination with beam mechanism, and with a bucket supported thereby; of a yoke having a bearing; a bucket-closer having a spindle journaled in said bearing; and means for rotating said bucket-closer.

9. In a weighing-machine, the combination of beam mechanism, and with a bucket supported thereby; of a suitably-supported bearing; and a bucket-closer journaled to rotate in said bearing.

10. In a weighing-machine, the combination with beam mechanism, and with a bucket supported thereby; of a yoke having a bearing; a bucket-closer provided with a spindle journaled in said bearing; a ratchet carried by said closer; and a pawl supported by a relatively-fixed part of the machine for engaging the teeth of said ratchet.

11. In a weighing-machine, the combination with a bucket, the discharge-orifice of which is circular; of a circular bucket-closer tightly fitting within the bucket when in its normal position; means for supporting said closer; and means for rotating said closer on its opening movement.

12. The combination with weighing mechanism and with a bucket supported thereby, of a closer for said bucket; and means for imparting to the closer a step-by-step movement, whereby the mass of material sustained by the closer will be positively dislodged or shaken therefrom.

13. The combination with weighing mechanism and with a bucket supported thereby, of a chute; and a valve for said chute having oppositely-directive stream-outlets, one of which is a conduit having guide-walls for the drip-stream.

14. In a weighing-machine, the combination with beam mechanism; and with a bucket supported thereby; of a chute; a valve for said chute having oppositely-directive stream-outlets; a coacting valve for controlling one of said streams of material; and valve-actuating mechanism.

15. In a weighing-machine, the combination with beam mechanism, and with a bucket supported thereby; of a chute; a valve therefor having oppositely-directive stream-outlets; a coacting valve supported by said first-mentioned valve; and valve-actuating mechanism.

16. In a weighing-machine, the combination with a chute; of a valve therefor having a discharge edge, the wall of which is intersected by a conduit, and which valve has also arms thereon; a valve supported between said arms; and valve-actuating mechanism.

17. In a weighing-machine, the combination with a bucket having a closer; of a chute; a valve therefor having oppositely-directive stream-outlets; a valve for controlling one of said streams; and reciprocally-effective stops operative, respectively, with said valves and closer.

18. In a weighing-machine, the combination with a chute, of a main valve; a rock-shaft supported between said main valve and the frame of the machine; a supplemental valve; a connection between said rock-shaft and supplemental valve; a bucket having a closer; and reciprocally-effective stops operative with said supplemental valve and closer.

19. In a weighing-machine, the combination with a chute, of a valve therefor; a rock-shaft supported in part by said valve; a supplemental valve; a connection between said supplemental valve and rock-shaft; a rod operatively connected with said shaft; and a lever for engaging said rod.

20. In a weighing-machine, the combination with a chute; of a main valve having a discharge edge and a drip-stream outlet; a shaft supported in part by said main valve and operatively connected with the supplemental valve; a bucket and its closer; and reciprocally-effective stops operative, respectively, with said valves and closer.

21. In a weighing-machine, the combination with a chute, of a main valve; a supplemental valve; a rock-shaft supported in part by said main valve and having a stop-rod; a connection between said rock-shaft and supplemental valve and a suitable stop for engaging said rod at a predetermined point in the operation.

22. In a weighing-machine, the combination with a chute, of a main valve having a discharge edge and a stream-outlet; of a supplemental valve pivotally supported adjacent to said main valve; a drip-valve connected to said supplemental valve; a rock-shaft supported in part by said main valve and operatively connected with the supplemental and drip valves; and valve-actuating mechanism connected to said rock-shaft.

FRANCIS H. RICHARDS.

Witnesses:
FRED. J. DOLE,
F. N. CHASE.